H. C. PETERSEN.
HYDROAEROPLANE.
APPLICATION FILED APR. 23, 1918.

1,307,318.

Patented June 17, 1919.
5 SHEETS—SHEET 1.

H. C. Petersen
INVENTOR

BY H. S. Hill
ATTORNEY.

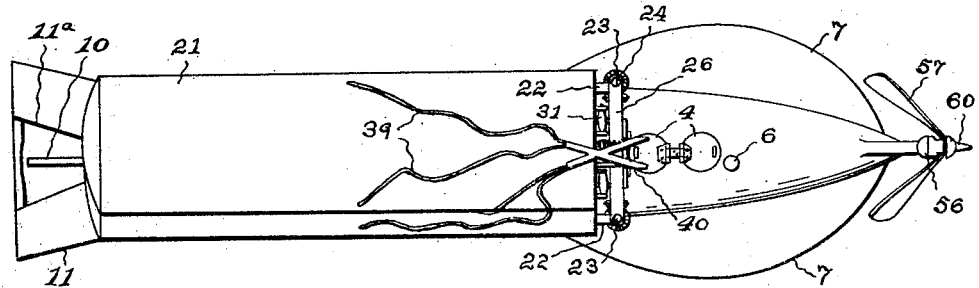
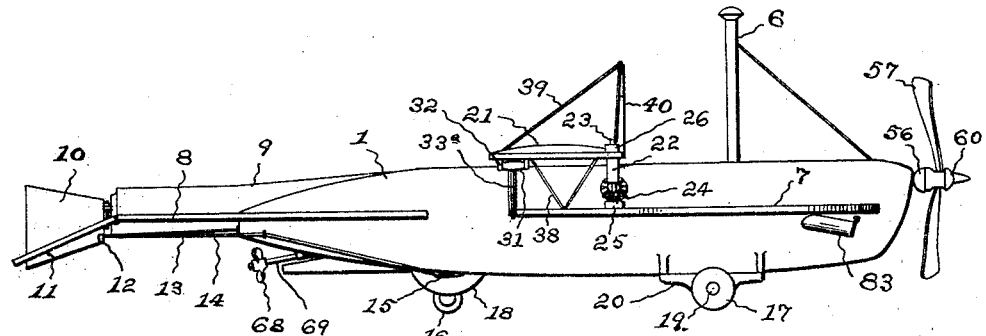
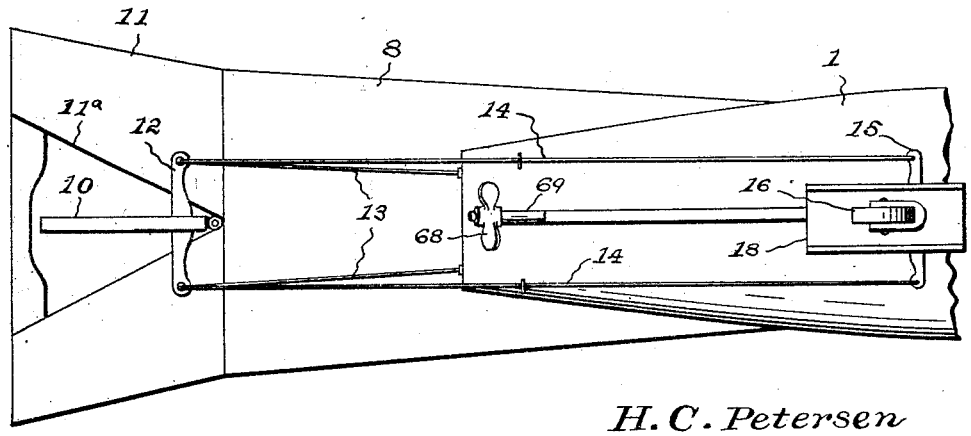

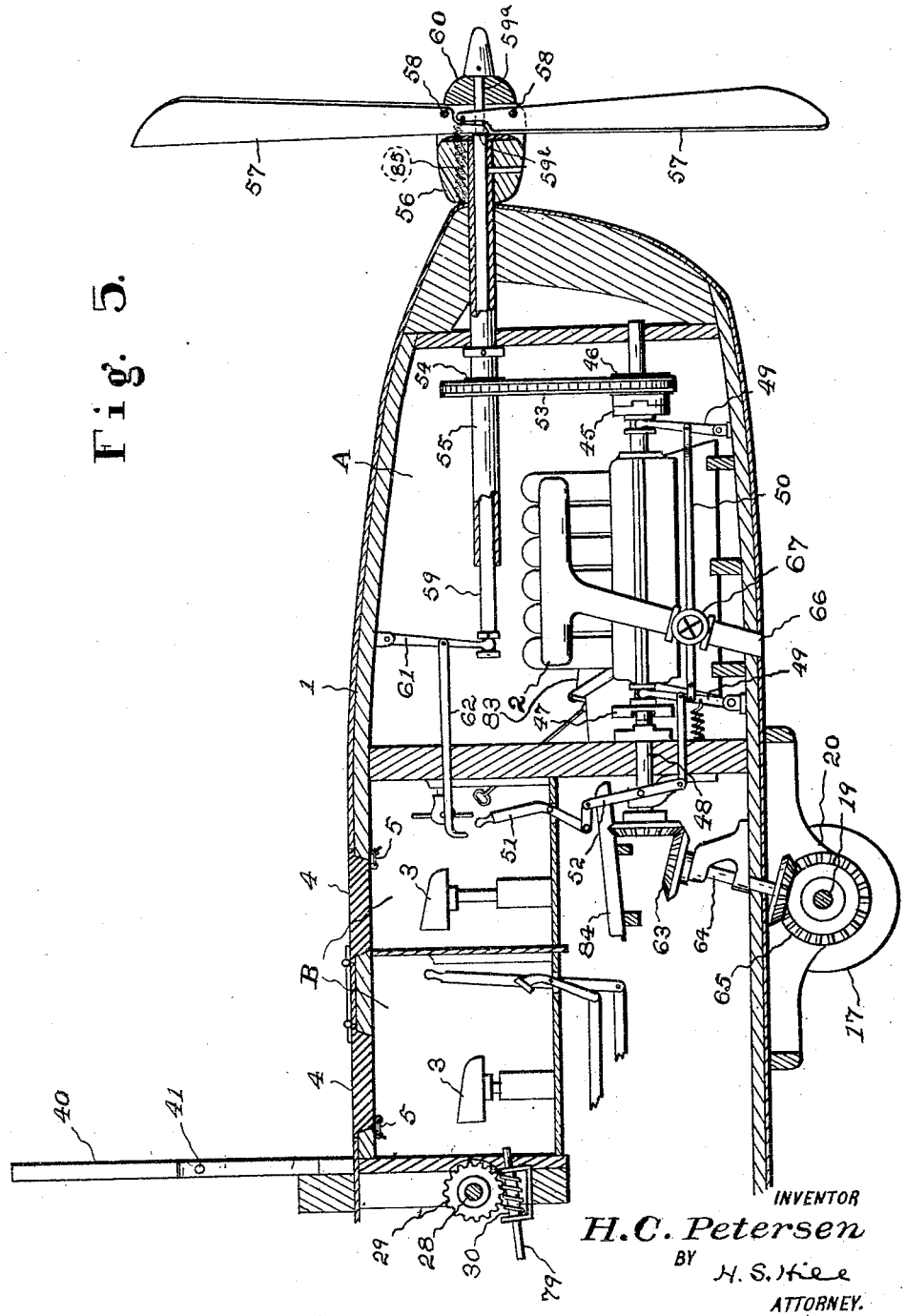

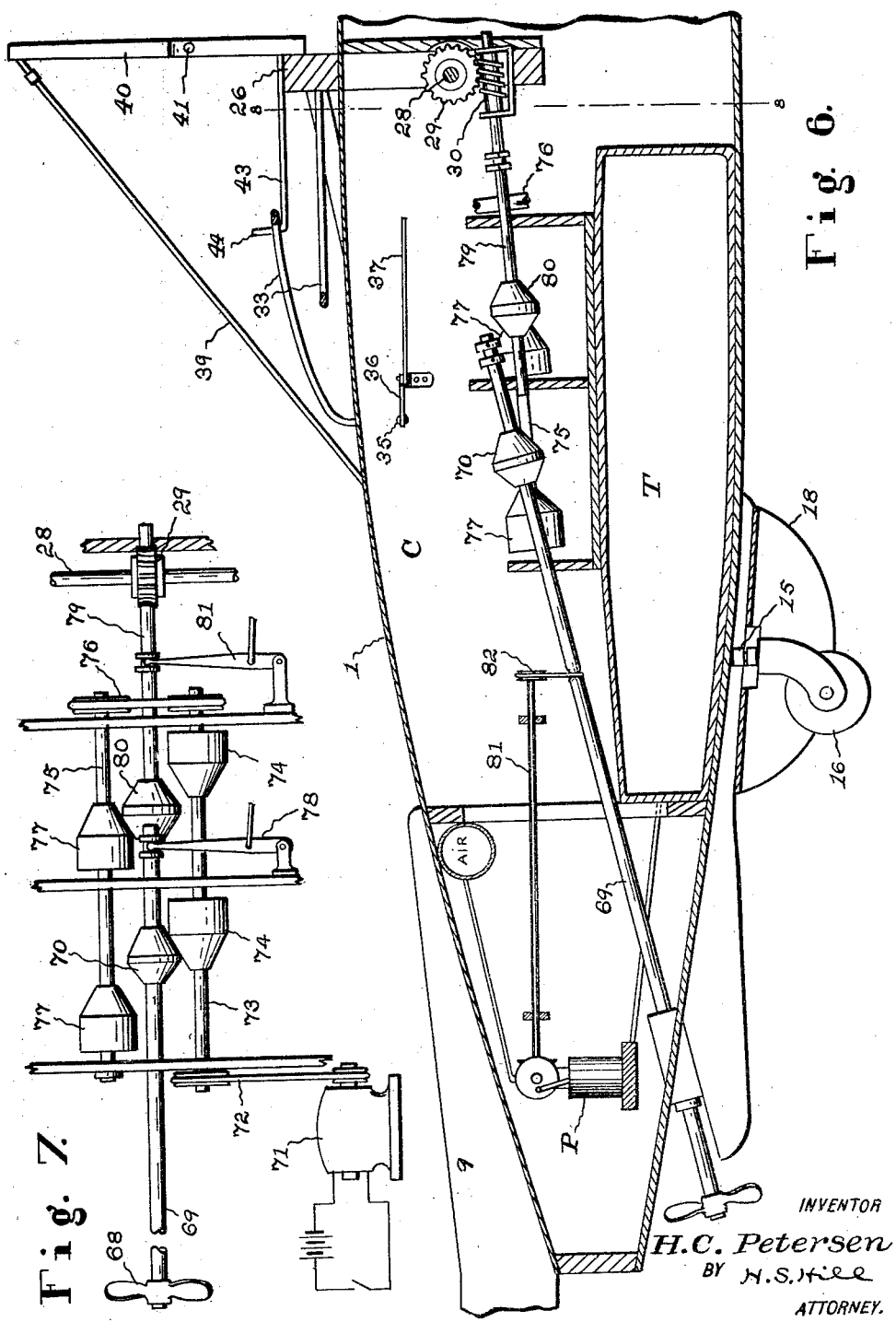

H. C. PETERSEN.
HYDROAEROPLANE.
APPLICATION FILED APR. 23, 1918.

1,307,318.

Patented June 17, 1919.
5 SHEETS—SHEET 5.

H. C. Petersen
INVENTOR

BY H. S. Hill

ATTORNEY.

UNITED STATES PATENT OFFICE.

HANS CHRISTIAN PETERSEN, OF LUDINGTON, MICHIGAN.

HYDROAEROPLANE.

1,307,318.  Specification of Letters Patent.  Patented June 17, 1919.

Application filed April 23, 1918. Serial No. 230,282.

*To all whom it may concern:*

Be it known that I, HANS CHRISTIAN PETERSEN, a subject of the King of Denmark, who have declared my intention of becoming a citizen of the United States, residing at Ludington, in the county of Mason, State of Michigan, have invented a new and useful Hydroaeroplane; and I do hereby declare the following to be a full, clear, and exact description of the invention, such as will enable others skilled in the art to which it appertains to make and use the same.

The present invention relates to a hydro-aeroplane and has for its object to provide a craft which embodies novel features of construction whereby it is adapted either to be used in water as a marine vessel or to be propelled through the air as an airship.

Further objects of the invention are to provide a hydro-aeroplane which admits of the wings or supporting planes being readily moved into and locked in operative position when the craft is to be used as an airship, or to be swung rearwardly into an out of the way position against the hull of the craft when the device is to be operated as a marine vessel, which provides effective means for propelling the craft through the water as well as through the air, which may be equipped with torpedo tubes and used for the discharge of torpedoes while submerged, and which is at all times under the perfect control of the operators.

With these and other objects in view, the invention consists in certain novel combinations and arrangements of the parts as will more fully appear as the description proceeds, the novel features thereof being pointed out in the appended claims.

For a full understanding of the invention, reference is to be had to the following description and accompanying drawings, in which:—

Fig. 2 is a similar view with the supporting planes swung rearwardly into inoperative position and the front propeller partially collapsed, the parts being adjusted so that the device can be used as a submarine vessel.

Fig. 3 is a side elevation of the hydro-aeroplane, the supporting planes and front propeller being adjusted for use as a flying machine.

Fig. 4 is a bottom plan view of the rear end of the craft, showing the operative connection between the vertically disposed rudder and the rear caster wheel.

Fig. 5 is a longitudinal sectional view through the forward end of the craft.

Fig. 6 is a similar view through the rear end of the craft.

Fig. 7 is a top plan view of the gearing which is used for driving the marine propeller and folding and unfolding the supporting planes.

Corresponding and like parts are referred to in the following description and indicated in all the views of the drawings by the same reference characters.

Figure 1:
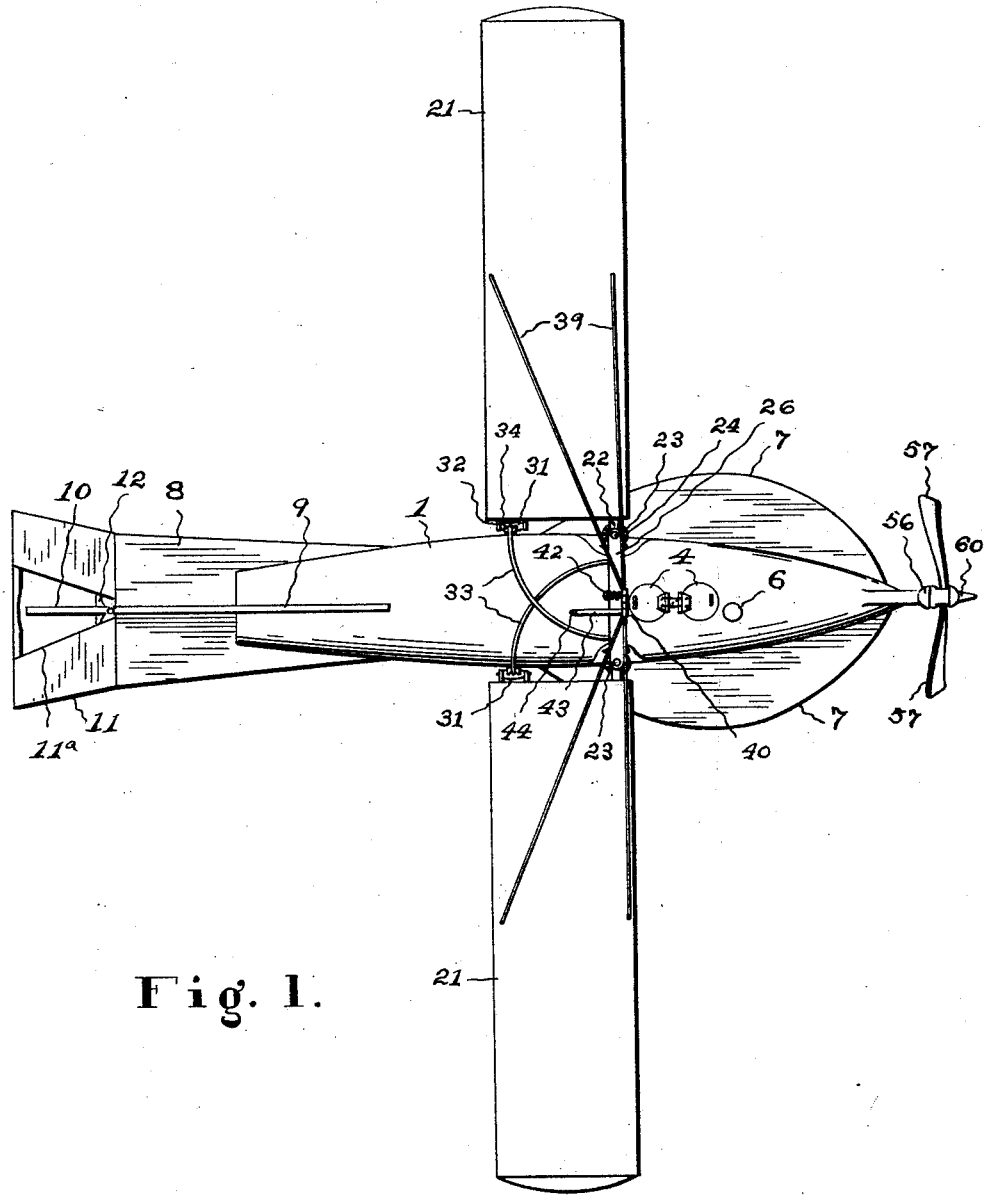
Figure 1 is a top plan view of a hydro-aeroplane constructed in accordance with the invention, the supporting planes being swung outwardly and the front propeller being adjusted for use as a flying machine.

One concrete embodiment of the invention is illustrated by the drawings, although it will be understood that the idea is susceptible of many changes and modifications without departing from the spirit of the invention or the scope of the claims. The numeral 1 designates the hull or body of the craft, said hull having a water-tight construction and having the usual cigar shaped contour so as to pass through the air or water with a minimum degree of resistance. The forward end of the hull is shown as partitioned off to provide a chamber A within which an internal combustion engine 2 is mounted. Just back of the chamber A are compartments B which are intended to receive the two operators of the craft, said compartments being provided with seats 3 and hatches 4 being provided in the hull at the top of the compartments. These hatches can be opened when the device is above water, although they are tightly closed and secured by the latches 5 when the craft is submerged. A conventional periscope 6 projects upwardly from the hull and enables the operators to obtain a complete view of the surroundings. To the rear of the compartments B is a large compartment C within which the ballast tank T, pumps P and marine propulsion mechanism are mounted.

The forward end of the hull 1 is provided upon the exterior thereof with laterally projecting and longitudinally extending stabilizing planes 7. A rear stabilizing plane 8 projects from the stern of the craft and is arranged in the same horizontal plane as the front stabilizing planes 7. The rear end of the craft is also provided at the top thereof with a vertically disposed longitudinally extending fin 9. A vertical rudder 10 is pivotally connected to the rear end of the fin 9, while a horizontal rudder 11 is pivotally connected to the rear end of the stabilizing plane 8, the latter being cut away at 11$^a$ to provide a clearance space for the operation of the vertical rudder 10. These rudders may be manipulated by any suitable or conventional means, and enable the craft to be directed both vertically and horizontally in its movements through the air or water. The vertical rudder 10 has a cross bar 12 rigidly connected thereto, operating cables 13 being connected to the ends of the cross bar for swinging the rudder, and the said cross bar being also connected by cables 14 to a similar cross bar 15 which is applied to a caster wheel 16 located under the rear end of the hull. This caster wheel 16 operates with a pair of forward wheels 17 to support the craft when it is on land. Suitable guard means 18 is shown as provided for protecting the caster wheel from injury, while forward ground wheels 17 are rigid with a horizontal shaft 19 which extends transversely across the device and is journaled within suitable bearings 20.

Figure 9:
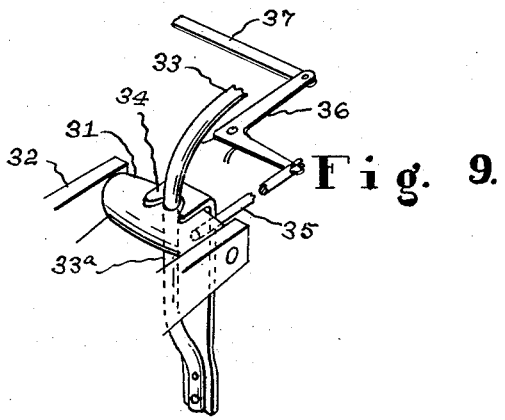
Fig. 9 is an enlarged detail view of one of the latches which are utilized for locking the supporting planes in operative position.

The main supporting planes 21 are formed of some material such as tin which is impervious to water, and are mounted so that they can either be swung outwardly into positions at right angles to the axis of the hull, as indicated by Fig. 1, or swung rearwardly in a superposed relation over the rear end of the hull, as indicated by Fig. 2. The inner end of each of the main planes is rigidly connected by means of a bracket 22 at the forward corner thereof to a short vertical shaft 23. These shafts 23 are provided at their lower ends with pinions 24, and are journaled between arms 25 projecting laterally from the hull and the overhanging ends of a transverse beam 26 which extends across the top of the hull. The pinions 24 mesh with pinions 27 on a horizontal shaft 28 which extends transversely through the hull 1, suitable bearings and packing means being provided in connection with the shaft. A worm wheel 29 is rigid upon the shaft 28 at an intermediate point in the length thereof, and meshes with a worm 30 which can be driven by means to be hereinafter described to rotate the shaft and swing the planes either outwardly into operative position or inwardly into inoperative position. The rear corners at the inner ends of the supporting planes are provided with guide blocks 31 which are pivotally mounted between the arms 32 and provided with transverse openings which slidably receive guide rods 33. The forward ends of the guide rods are connected to the transverse beam 26 and the guide rods extend rearwardly from the beam in a superposed relation to each other, being each curved in the arc of a circle of which the respective shaft 23 is the center. The rear ends of the arcuate guide rods 33 are extended downwardly at the sides of the hull, as indicated at 33$^a$, being rigidly secured to the hull at their lower ends. The guide blocks 31 slide freely upon the guide rods 33 as the main planes 21 are moved in or out, and the pivotal mounting of the guide blocks enables them to pass from the horizontal to the upright portions of the guide rods without binding. When the planes 21 have been swung outwardly to the limit of their movement and are in positions at right angles to the axis of the hull, the guide blocks 31 move downwardly upon the upright portions 33$^a$ of the guide rods, in which positions they are held by spring latches or detents 34. The main planes are thus locked rigidly in operative position, enabling the craft to be successfully used as an airship. These latch members or detents 34 are shown most clearly by Fig. 9, and any suitable means such as the plungers 35 may be utilized for releasing the detents, said plungers passing through suitable stuffing boxes and being connected by bell crank levers 36 to forwardly extending operating rods 37.

Figure 8:
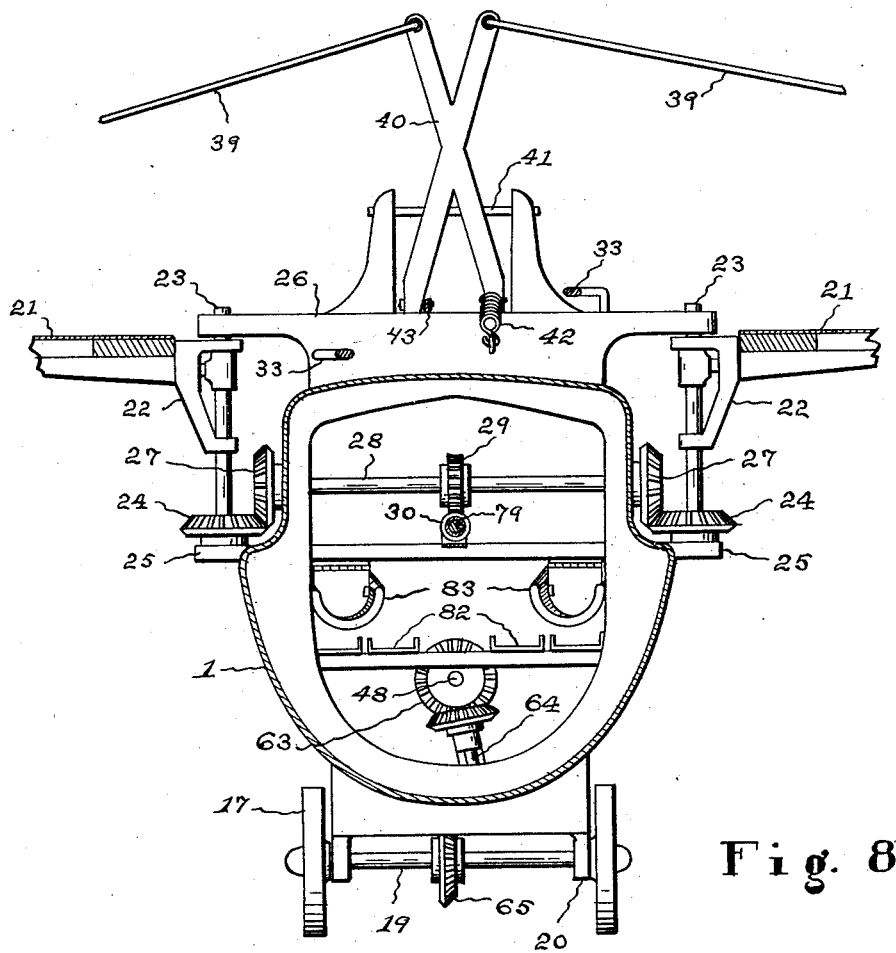
Fig. 8 is a transverse sectional view on the line 8—8 of Fig. 6.

Brace wires or cables 38 connect the lower faces of the main planes 21 to the hull and serve to brace the supporting planes when they are swung outwardly into operative position, although they do not interfere in any manner with the folding of the main planes. In a similar manner a second set of brace wires 39 connect the upper faces of the main planes with a folding mast 40. As shown by Fig. 8 this mast 40 may have an X shaped formation, being pivoted upon a horizontal shaft 41 and normally held in an upright position by a spring 42. An arm 43 is pivotally connected to the lower end of the mast 40 and extends rearwardly therefrom, terminating in a foot 44 which is arranged in the path of the rear edge of one of the main planes 21 (see Figs. 1 and 6). When the planes are folded the foot 44 is engaged by the edge of the uppermost plane and the arm 43 shoved forwardly, thereby folding the mast 40 downwardly into inoperative position, as indicated by Fig. 2. All of the parts and super-structure upon the hull will then be collapsed so as to offer a minimum amount of resistance to the passage of the hull through the water when the craft is used as a marine vessel. However, when the planes are swung outwardly into operative position the mast 40 is simultaneously swung upwardly by the action of the spring 42, thereby holding the upper brace cables 39 taut so that the planes are securely braced both from above and from below.

The crank shaft of the internal combustion engine 2 which is mounted in the forward compartment A has a clutch connection 45 with a sprocket wheel 46 at the forward end thereof, and a similar clutch connection 47 with an independent shaft 28 at the rear end thereof. The shifting levers 49 for the two clutches are connected by a link 50 so that they operate in unison, the arrangement being such that when the forward clutch 45 is closed the rear clutch 47 is open, and vice versa. These clutches are controlled by an operator in one of the compartments B by means of a lever 51, said lever being operatively connected as indicated at 52 to one of the shifting levers 49.

It will thus be obvious that by manipulating the lever 51 the clutches 45 and 47 can be controlled and the engine 2 caused to drive either the sprocket wheel 46 or the independent shaft 48. The sprocket wheel 46 is connected by a chain 53 to a sprocket 54 on a tubular propeller shaft 55 which is suitably journaled upon the hull and projects from the forward end thereof. The projecting end of the tubular shaft 55 is provided with a propeller head 56 upon which the propeller blades 57 are mounted, said blades being pivoted at 58 so that they can be partially folded rearwardly, as indicated by Fig. 2, when this aerial propeller is not in use. A rod 59 is slidable through the tubular propeller shaft 55, and has a head 60 at the forward extremity thereof. When the rod 59 is drawn rearwardly and the head 60 thereof moved toward the propeller head 56, the blades 57 are held rigidly in operative position, as indicated by Figs. 1 and 5. However, when the rod 59 is moved forwardly and the head 60 is moved away from the propeller head 56 the blades 57 of the propeller are swung rearwardly into a partially collapsed position, thereby reducing their resistance to the passage of the device through the water when the craft is operated as a submarine vessel. This partial folding of the propeller blades 57 when the rod 59 is moved forwardly is due to the fact that the forward end of this rod is reduced at $59^a$, said reduced portion of the rod being straddled by the forked inner ends of the pivotally mounted propeller blades, and terminating in a shoulder $59^b$ which engages the forked ends of the propeller blades to swing the blades about their pivot pins 58 when the rod 59 is moved forwardly. A spring 85 may be provided for returning the blades 59 to normal position when the rod 59 is moved rearwardly, and they will be clamped in normal position by the heads 60 when the aerial propeller is in operation. The rear end of the rod 59 is shown as engaged by a shifting lever 61 which is connected to an operating plunger 62, the latter extending rearwardly into one of the compartments B so that the aerial propeller can be readily controlled by the operators of the craft. The independent shaft 48 at the rear end of the crank shaft of the engine 2 is connected by the gearing 63 to a short upright shaft 64 which extends downwardly through the hull, the lower end thereof being connected by the gearing 65 to the horizontal shaft 19 upon which the ground wheels 17 are mounted, as previously described. It will thus be obvious that when the clutch 47 is closed power will be transmitted from the engine 2 to the ground wheels 17, thereby providing for propelling the craft on land. It will also be remembered that the caster wheel 16 is operatively connected to the vertical rudder 10 so that the craft can be directed in its movements on land. The exhaust pipe 66 of the engine 2 is shown for convenience as extending downwardly through the bottom of the hull, and as provided with a valve 67 which can be closed when the craft is used as a submarine, thereby preventing water from entering the engine.

When the craft is submerged the internal combustion engine 2 is stopped, and the aerial propeller blades 57 collapsed, and the marine propeller 68 brought into operation. This propeller is located under the stern end of the hull, being carried by an upwardly and forwardly inclined shaft 69 which is slidable longitudinally within its bearings and is provided with a double conical friction-gear 70. An electric motor 71 is utilized for driving the craft when submerged, said motor being operatively connected in any suitable manner as by means of the belt and pulley connections 72 to a main drive shaft 73 which has a pair of friction cones 74 thereon. A counter-shaft 75 has a belt and pulley connection 76 with the main drive shaft 73, being arranged on the opposite side of the propeller shaft 69, and being provided with a pair of friction cones 77 which face in opposite directions to the friction cones 74 on the main drive shaft 73. A shifting lever 78 is provided for sliding the propeller shaft 69 to bring the double cone 70 thereon into engagement with one of the friction cones 74 on the main drive shaft 73, or one of the cones 77 on the counter-shaft 75. In the former instance the craft is propelled forwardly, while in the latter instance the propeller is reversed and the craft caused to back.

This friction gearing is also utilized for folding and unfolding the main planes 21. The worm 30 has a feather and spline connection with a longitudinal shaft 79 which extends rearwardly therefrom and is slidable within its bearings, said shaft carrying a double cone 80. A shifting lever 81 is provided for moving this worm shaft 79 back and forth to bring the double cone 80 into engagement with one of the friction cones 74 of the main drive shaft 73, or one of the friction cones 77 of the counter-shaft 75. The worm shaft 79 can thus be rotated in either direction and the main planes 21 swung either outwardly into operative position or rearwardly into inoperative position. The pumps P for controlling the operation of the ballast tank T are of the conventional construction, being controlled by suitable clutches and driven by a shaft 81 which is suitably connected as by means of the belt and pulley connection 82 to the propeller shaft 69 (see Fig. 6).

The forward end of the hull is provided with torpedo tubes 83 which may be of any suitable construction, and shelves 84 for the support of torpedoes are arranged at the rear ends of the torpedo tubes under the compartments B. These torpedoes can be discharged when the vessel is submerged, and if desired means may be provided for enabling the torpedoes to be placed in the tubes by operators within the compartments B, thereby avoiding the necessity of unnecessarily moving about in the craft when it is submerged.

Having thus described the invention, what I claim as new and desire to secure by Letters Patent, is:—

1. A craft including a hull, vertical shafts at opposite sides of the hull, supporting planes rigid with the vertical shafts, a transverse shaft extending through the hull, gearing between the transverse shaft and the vertical shafts for swinging the planes outwardly away from the hull or inwardly toward the hull, and guide means for directing the planes in their swinging movements and bringing them into a superposed relation upon the hull when swung inwardly to the limit of their movement.

2. A craft including a hull, supporting planes arranged upon opposite sides of the hull, one corner of the inner end of each of the supporting planes being pivotally connected to the hull, guide means upon the other corner of the inner end of each supporting plane, means for simultaneously swinging the planes outwardly into operative position or inwardly into inoperative position, arcuate guide rods extending across the hull in a superposed relation and having the ends thereof extended downwardly at opposite sides of the hull, said guide rods engaging the guide-means of the planes and bringing the planes into a superposed relation when folded, the guide means of the planes engaging the downwardly extended ends of the guide rods when the planes are in operative position, and latch means for engaging the said guide means to lock the planes in operative position.

3. A craft including a hull, supporting planes mounted upon opposite sides of the hull, a vertical shaft rigid with one corner of the inner end of each of the planes and journaled upon the hull, a transverse shaft extending through the hull and having the ends thereof geared to the vertical shafts for simultaneously swinging the planes outwardly into operative position or inwardly into inoperative position, a guide block at the other inner corner of each of the planes, arcuate guide rods extending across the hull in a superposed relation and having the outer ends thereof extended downwardly at the sides of the hull, said guide rods engaging the guide blocks of the planes and coöperating therewith to direct the planes in their swinging movements and bring them into a superposed relation when folded, said blocks engaging the downwardly extended ends of the guide rods when the planes are in operative position, and latch means engaging the blocks to hold the planes in operative position.

4. A craft including a hull, folding supporting planes mounted upon the hull, a folding mast upon the hull, means for automatically folding the mast when the planes are folded, and brace cables between the mast and supporting planes.

5. A craft including a hull, folding supporting planes mounted upon the hull, a folding mast, yielding means normally holding the mast in operative position, means for automatically folding the mast when the planes are folded, and brace cables between the mast and planes.

6. A craft including a hull, supporting planes pivotally mounted upon opposite sides of the hull, means for swinging the planes outwardly into operative position or inwardly into inoperative position, a pivotally mounted folding mast normally projecting upwardly from the hull, brace cables between the mast and supporting planes, and a plunger connected to the mast and arranged in the path of one of the supporting planes for engagement thereby to fold the mast when the supporting planes are swung inwardly into inoperative position.

In testimony whereof I have signed my name to this specification in the presence of two subscribing witnesses.

HANS CHRISTIAN PETERSEN.

Witnesses:
 ARTHUR J. JOHNSON,
 CARL JOHNSON.

Copies of this patent may be obtained for five cents each, by addressing the "Commissioner of Patents, Washington, D. C."